(12) United States Patent
Kubertschak et al.

(10) Patent No.: US 11,513,212 B2
(45) Date of Patent: Nov. 29, 2022

(54) MOTOR VEHICLE AND METHOD FOR A 360° DETECTION OF THE MOTOR VEHICLE SURROUNDINGS

(71) Applicant: AUDI AG, Ingolstadt (DE)

(72) Inventors: Tim Kubertschak, Ingolstadt (DE); Thomas Bock, Kipfenberg (DE)

(73) Assignee: AUDI AG, Ingolstadt (DE)

( * ) Notice: Subject to any disclaimer, the term of this patent is extended or adjusted under 35 U.S.C. 154(b) by 724 days.

(21) Appl. No.: 16/341,687

(22) PCT Filed: Oct. 11, 2017

(86) PCT No.: PCT/EP2017/075963
§ 371 (c)(1),
(2) Date: Apr. 12, 2019

(87) PCT Pub. No.: WO2018/069405
PCT Pub. Date: Apr. 19, 2018

(65) Prior Publication Data
US 2020/0025873 A1    Jan. 23, 2020

(30) Foreign Application Priority Data
Oct. 14, 2016 (DE) .......................... 102016220075.5

(51) Int. Cl.
*G01S 7/40* (2006.01)
*G01S 13/931* (2020.01)
(Continued)

(52) U.S. Cl.
CPC .............. *G01S 13/931* (2013.01); *G01S 7/40* (2013.01); *G01S 13/89* (2013.01); *G01S 17/89* (2013.01);
(Continued)

(58) Field of Classification Search
CPC .................................................... G01S 13/931
See application file for complete search history.

(56) References Cited

U.S. PATENT DOCUMENTS 5,341,141 A * 8/1994 Frazier .................... G01S 13/89
342/179
7,340,380 B2 3/2008 Klotz et al.
(Continued)

FOREIGN PATENT DOCUMENTS

DE 102008013366 A1 9/2009
DE 102011116169 A1 4/2013
(Continued)

OTHER PUBLICATIONS

International Search Report and Written Opinion of the International Searching Authority directed to related International Patent Application No. PCT/EP2017/075963, dated Feb. 1, 2018, with attached English-language translation; 25 pages.
(Continued)

*Primary Examiner* — Erin F Heard
*Assistant Examiner* — Hailey R Le
(74) *Attorney, Agent, or Firm* — Sterne, Kessler, Goldstein & Fox P.L.L.C.

(57) ABSTRACT

The invention relates to a method and a motor vehicle comprising a sensor assembly for a 360° detection of the motor vehicle surroundings. The sensor assembly has multiple sensors of the same type, wherein each of the multiple sensors has a specified detection region and the sensors are distributed around the exterior of the motor vehicle such that the detection regions collectively provide a complete detection zone which covers the surroundings in a complete angle about the motor vehicle at a specified distance from the motor vehicle. The sensors are each designed to detect the surroundings in their respective detection region as respective sensor data in respective successive synchronized time
(Continued)

increments. The sensor assembly has a pre-processing mechanism which fuses the sensor data of each of the sensors in order to generate a three-dimensional image of the surroundings for a respective identical time increment and provides same in a common database.

20 Claims, 2 Drawing Sheets

(51) Int. Cl.
  *G01S 13/89* (2006.01)
  *G01S 17/89* (2020.01)
(52) U.S. Cl.
  CPC .......... *G01S 2013/9323* (2020.01); *G01S 2013/9324* (2020.01); *G01S 2013/93271* (2020.01); *G01S 2013/93272* (2020.01); *G01S 2013/93273* (2020.01); *G01S 2013/93274* (2020.01)

(56) References Cited

U.S. PATENT DOCUMENTS

| | | | |
|---|---|---|---|
| 8,825,260 | B1 | 9/2014 | Silver et al. |
| 2014/0240502 | A1 | 8/2014 | Strauss et al. |
| 2018/0012370 | A1* | 1/2018 | Aghamohammadi ............... G05D 1/0274 |
| 2020/0320728 | A1* | 10/2020 | Tsunashima ........... G01C 11/14 |

FOREIGN PATENT DOCUMENTS

| | | |
|---|---|---|
| DE | 102013003117 A1 | 8/2013 |
| DE | 102013102153 A1 | 9/2013 |
| DE | 102014007565 A1 | 11/2015 |
| DE | 102015000426 A1 | 7/2016 |
| EP | 2058675 A2 | 5/2009 |
| EP | 2736017 A2 | 5/2014 |
| EP | 2806288 A1 | 11/2014 |
| WO | WO 03/008995 A1 | 1/2003 |
| WO | WO-2015/176933 A1 | 11/2015 |

OTHER PUBLICATIONS

Kubertschak, Tim, and Maehlisch, Mirko, "Towards a Unified Architecture for Mapping Static Environments," 17th International Conference on Information Fusion, Society of Information Fusion, Jul. 7, 2014; 8 pages.

International Preliminary Report on Patentability directed to related International Patent Application No. PCT/EP2017/075963, completed Jan. 25, 2019, with attached English-language translation; 11 pages.

* cited by examiner

MOTOR VEHICLE AND METHOD FOR A 360° DETECTION OF THE MOTOR VEHICLE SURROUNDINGS

TECHNICAL FIELD

An embodiment of the disclosure concerns a motor vehicle with a sensor arrangement for 360° detection of the surroundings of the motor vehicle. Another embodiment concerns a procedure for 360° detection of the surroundings of a motor vehicle.

BACKGROUND

Current research and development-related efforts in science and industry are strongly concerned with driving highly and fully automated motor vehicles. To make highly and fully automatic driving possible, it must be possible to fully understand the surroundings of the motor vehicle as reliably as possible. To make such a 360° detection possible, scientific establishments as well as many industrial developers usually use a single laser scanner with a three-dimensional detection zone to achieve this goal, wherein the detection zone then covers the full surrounding field, i.e. 360°, around the vehicle. To make this possible, such a 3D laser scanner is usually installed on the roof of a motor vehicle. The sensor data from this laser constitute the basis for the detection of the surrounding field, i.e. the detection of static and moving obstacles as well as road markings, and are thus a fundamental and necessary element for autonomous driving. However the use of this sensor leads to certain limitations, which impede its employment in mass produced vehicles and make such employment more difficult. On the one hand, these limitations include the high price. This is due to the complex design of the 3D laser, which must often be designed to be rotatable so as to be able to cover 360°, and thus requires complex mechanics and control. Its prominent, central, and at the same time design-relevant mounting position on the roof of a motor vehicle is, on the other hand, very disadvantageous. The use of the current algorithms for autonomous driving based on this laser is therefore questionable.

U.S. Pat. No. 8,825,260 B1 describes a procedure by means of which it is possible to differentiate between the ground level and objects along certain principal directions. Detection takes place on the basis of a point cloud, which is produced either from the data from a laser or from a camera. Sensor units can be mounted onto rotatable or inclinable platforms so as to provide information about the entire space surrounding the vehicle.

As described above, this procedure also has the problem that these sensors are very expensive, since they must be mobile and/or rotatable so as to be able to record the entire space surrounding the vehicle. The positioning of the sensor on the roof of the motor vehicle can furthermore also not be avoided in this case.

DE 10 2014 007 565 A1 describes a procedure for determining a respective boundary of at least one object. The outer boundaries of concave objects, generally parking spaces, are then detected in a point cloud. The point cloud is produced exclusively from data from an optical sensor, which is preferably a camera. A laser scanner can also be used alternatively or additionally. But it is not possible to cover a 360° field of view around the motor vehicle in this way.

EP 2 736 017 A2 describes a procedure for determining the motion of a motor vehicle, whereby the distance traveled by a motor vehicle between two points in time is determined. To accomplish this, two-dimensional intensity values from a time-of-flight camera, on one hand, and 3D information corresponding to the values, on the other hand, are used to calculate the displacement between the two times. This also does not provide a 360° detection range.

BRIEF DESCRIPTION OF THE DRAWINGS/FIGURES

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

It is the object of the presented embodiments to provide a motor vehicle and a procedure for the 360° capture of the surroundings of the motor vehicle, by means of which three-dimensional coverage of the surroundings is made possible in a way that is as economical and as simple as possible, and in particular by means of which the use of existing and proven algorithms for data processing is enabled.

The motor vehicle of the embodiments in the disclosure has a sensor array for 360° capture of the surroundings of the motor vehicle, with the sensor array having several sensors of the same type, with these several sensors respectively having a predetermined scanning range and being distributed over the outside of the motor vehicle so that the scanning ranges provide for an overall scanning range, which covers a range of the surroundings in a complete angle around the motor vehicle at a predetermined distance from the motor vehicle, and in particular beyond that distance. The sensors are then set up so that they record the environment in their respective scanning range as respective sensor data in respective successive synchronized time steps. The sensor array furthermore comprises a preprocessing mechanism, which fuses the data from the sensors so as to produce a three-dimensional image of the range of the surroundings for a respective same time step and presents it in a common database.

The embodiments of the present disclosure offer the advantage that it is possible for the sensor data from an expensive 360° 3D laser scanner to be approximated by a combination of several more convenient and simpler sensors of the same type, i.e. of the same modality and/or using the same measurement principle, but nevertheless covering the entire range of vision of such 3D laser scanners. The costs can thereby be reduced significantly compared with an expensive 360° 3D laser scanner. However, a particularly big advantage derives from the fusion of uni-temporal sensor data. This means that only those data that are assigned to the same collection time step from the single sensors are fused, so as to provide a three-dimensional image of the surrounding area in a common database. The display of the resulting fused data is then advantageously equivalent to a display of sensor data captured by just one individual 360° 3D sensor at an individual time step. This makes it possible, after data fusion, to fall back on previously existing and developed algorithms for 360° detection of the surroundings. The previously developed algorithms for full and highly automated driving can, for example, thereby be applied to the fused sensor data described in the common database.

The creation of the same database thus makes it possible for the invention to make use of algorithms on said database, achieve more rapid development through the use of said algorithms, achieve particularly efficient development via the direct application of research results in standard products, and achieve a cost reduction through the use of a plurality of sensors and, if possible, through sensor technologies, and a hidden installation of the sensors, which is of advantage for both the vehicle design and for sensor protection.

The respective sensors in an advantageous embodiment are respectively laser scanners.

Laser scanners are particularly advantageous in several respects. They are, on the one hand, particularly suitable for detection of the environment, particularly in applications involving highly or fully automatic operations, since they do not only allow for high resolution 3D capture of their surrounding environment, but are also designed to simultaneously provide intensity images of their surroundings. By this means, the sensor data, and in particular the intensity images, captured by laser scanners, can also be used to identify traffic lanes and road markings or the like. Laser scanners additionally provide their 3D data in the form of 3D point clouds, which can be readily fused into a common 3D point cloud, and this makes it possible to construct the very same database on which algorithms developed for the expensive 360° laser scanner operate.

However, in alternate embodiments, sensors of any type can be generally used, such that the sensors can also be radars or cameras or stereo-cameras or time-of-flight cameras or ultrasound sensors. The sensors of the sensor arrangement, either all radars, or all cameras, etc., present their respective captured sensor data in the common database as unitemporally fused.

It is then particularly advantageous for the sensors to be designed as 3D sensors, i.e. a respective sensor is designed to capture the environment as 3D data. This is, for example, the case for laser scanners, stereo-cameras, time-of-flight cameras, radars or ultrasound sensors. It is further advantageously possible to reduce the number of necessary sensors to a minimum by this means. This in turn reduces the space required for the sensors. It is however also possible to use 2D sensors, such as simple cameras. In this case, the entire coverage area is preferably redundantly covered by appropriate overlaps between the individual coverage areas of the cameras. It is thus possible, as with a stereo-camera, to also get distance information from any two overlapping image recordings by the simple cameras.

In a further advantageous embodiment, the preprocessing mechanism is designed to make the fused sensor data available as a database in the form of a 3D point cloud. This database is particularly advantageous since, as described above, most established algorithms operate on 3D point clouds as a database.

In a further advantageous embodiment, the preprocessing mechanism is designed to convert the fused sensor data into an object list representation or a fences representation or an occupancy grid representation. Such a conversion can take place either in addition to the representation of the sensor data as a 3D point cloud or as an alternative thereto. The databases and/or representations can then also be established depending on the nature of the sensors of the sensor arrangement. The representations can additionally be chosen based on the requirements imposed on the steps to be performed subsequently.

The objects taken from the fused sensor data can be recorded in object lists according to the object list representation. Obstacles can be represented as open or closed polylines as well as detected empty spaces via fence representations, also called polyline representations. In the case of an occupancy grid representation, the surroundings are divided into cells in a grid-like manner, which can be allocated according to different characteristics, such as, e.g., the probability that they are occupied. The allocation of these characteristics is accordingly based on the collected sensor data. Cells in which a laser scanner has recorded a scan point can, for example, be assigned a high or increased probability of occupancy.

In an additional advantageous embodiment, at least two of the detection zones of the sensors overlap, whereby an overlap region is made available, and where the preprocessing mechanism is designed to perform an alignment of the sensor data recorded by the respective sensors within the overlap range. Intersecting and/or overlapping detection zones of the sensors can then be used advantageously to, for example, to reduce measurement uncertainties and to achieve higher quality in sensor data acquisition. It is, for example, possible to reduce the measurement uncertainties of individual reflections when radar detectors are used to approximate a 360° 3D laser scanner. For example, in the case of typical radar detectors, the angular error increases with increasing distance from the sensor centerline. Fusion of the sensor data now advantageously offers the possibility of reducing this error in areas with overlapping sensor fields of vision, i.e. detection zones, and thus producing a more exact image of the surroundings. It is, for example, possible to achieve a quality that is as high as that achieved with the point cloud of the 360° 3D laser scanner in this way, even with relatively inaccurate data from good radars. Such improvements can also be obtained by matching the redundant sensor data using sensors of another type in the same way.

It is in particular possible to advantageously perform a sensor data correction and/or a measurement uncertainty correction and/or a correction of a probability of existence based on the comparison, for which the preprocessing mechanism is also preferably designed. The sensor data correction can, for instance, be performed by averaging the sensor data from identical locations of the surroundings captured by two respective sensors, in particular also with appropriate weighting depending on their respective measuring accuracies. The sensor data recorded by respective sensors in overlapping areas can also provide higher resolution through their addition in this overlapping detection zone, whereby a higher degree of detail of the three-dimensional image of the surroundings is made available. In the event that, in supplying the sensor data to the corresponding sensor data, the respective uncertainty of the measurement is also simultaneously provided, so as to, for example, derive the certitude or the reliability thereof for the detection or classification of an object in later processing steps, it is then also possible to perform a measurement uncertainty correction by means of the sensor data redundantly recorded in overlapping detection zones, which allocates a correspondingly smaller measurement uncertainty to these sensor data because of their redundancy. This also applies to probabilities of existence, which particularly refer to the existence of objects in the surroundings, where the aforesaid and accordingly correctable measurement uncertainties can be considered in the calculation of these probabilities of existence.

In another advantageous embodiment, the sensors are designed to provide information that is different from position information. In particular, this information may be intensity information and/or color information and/or speed information in a detected space surrounding the motor vehicle, with the motor vehicle having another processing mechanism and the preprocessing mechanism being designed to convey the data fused in the common database to the processing mechanism, with the processing mechanism being designed to combine the fused sensor data with the different information concerning the position information made available by the sensors. This makes it possible to not only make available the 3D information on the surroundings recorded by the sensors, but also to combine additional sensor-specific characteristics with the uni-temporally fused sensor data in a subsequent processing step. It is thus possible to make use of further information by way of the intensity values, e.g. provided by laser scanners, as well as by way of the colors made available by, e.g., RGB cameras or the speeds additionally made available by radars. The nature of this additional information then depends on the nature of the particular sensor being used. The reliability of the detection of the surroundings, such as the detection of static and moving objects, obstacles or road markings, can clearly be increased through the use of this additional information.

It is to also possible to use multiple sensors of different kinds to increase the reliability and robustness of the perception of the surroundings. It is, for example, possible for the motor vehicle to have several sensors of a first kind and several sensors of a second kind, with the sensor data captured by the sensors of the first kind being uni-temporally fused and the sensor data captured by the sensors of the second kind also being correspondingly uni-temporally fused and also being depicted in a common database, with the respective databases concerning the sensors of the first and the second kind not necessarily having to be alike. The respective uni-temporally fused sensor data from the sensors of different kinds can then be recombined and fused in subsequent processing steps, or they can also be subjected to further processing independently of one another. The reliability of driver assist systems can be additionally increased through the simultaneous imaging of the entire surroundings of the vehicle using different sensor measurement principles, such as, for example, radar and lasers.

In a further advantageous embodiment, the several sensors are disposed at a respective height, with the respective heights being in a predetermined height range regarding the vertical axis of the vehicle. This height range can be selected according to the requirements. It can also conform to the design of the sensors of the respective kind, in particular in conformance with their coverage in the vertical direction, i.e. in the direction of the vertical axis. To keep the entire coverage area as homogeneous as possible in its vertical extent, it is additionally advantageous for the sensors to be disposed on the same plane perpendicular to the vertical axis. For sensors, such as cameras, which have a large coverage area in the vertical direction, it is additionally advantageous to dispose these sensors in just one plane distributed around the vehicle.

Conversely, laser scanners usually have a very large coverage area in a first direction and a relatively small coverage area in a second direction that is perpendicular to first. It is, for example, possible for the coverage area in the first direction to extend over an angle of 140° to 160° with respect the laser scanner, while the coverage area in the second direction perpendicular thereto is, for example, at most 10°, in particular 3 to 5°.

Therefore, in a particularly advantageous embodiment, several first sensors of the multiple sensors are disposed at a respective first height and several second sensors of the multiple sensors are disposed at a respective second height, with the respective first height being respectively located in a predetermined first height range with respect to the vertical axis of the vehicle and the respective second height being located in a predetermined second height range with respect to the vertical axis of the vehicle, which second range is higher than the first height range. The sensors assigned to the first and the second height range must not necessarily be disposed on the same plane, but this is advantageous for reasons described above, because such a uniform height of the entire detection range can be achieved in the vertical direction. On the other hand, it can be advantageous not to dispose the sensors on shared planes, but rather distributed in an arbitrary way in their vertical position, so as to allow for better adaption possibilities to vehicle-specific geometries.

In order to uni-temporally fuse the sensor data from the individual sensors in an appropriate way it is advantageous to use the known positions of the individual sensors and their geometric relation to each other as well as optionally their alignment and/or orientation to establish a correct geometrical reference to the surroundings detected by the individual sensors. Known image registration procedures or the like can also alternatively or additionally be used for this purpose.

The motor vehicle can also have a driver assistance system, in particular for highly or fully automated driving, which system comprises the preprocessing mechanism and/or the processing mechanism, and which is designed to initiate or to perform an assistance function based on a result of an evaluation of the fused sensor data.

The invention moreover concerns a procedure for 360° capture of the surroundings of a motor vehicle, wherein several sensors of the same kind provide sensor data concerning a respective coverage zone in respective synchronized time steps, and where the respective coverage zones furthermore make available an overall coverage zone, which covers a range of the surroundings over a complete angle around the motor vehicle at a pre-determined distance from the motor vehicle. A preprocessing mechanism furthermore fuses the sensor data from the sensors over a respectively equal time interval and records the data in a common database.

The characteristics, combinations of characteristics described for the motor vehicle of the described embodiments and their advantages apply in the same way to the procedure embodiments of the disclosure. The concrete characteristics specified in connection with the motor vehicle and its embodiments additionally allow for a further extension of the procedure by way of further processing steps.

Figure 1:
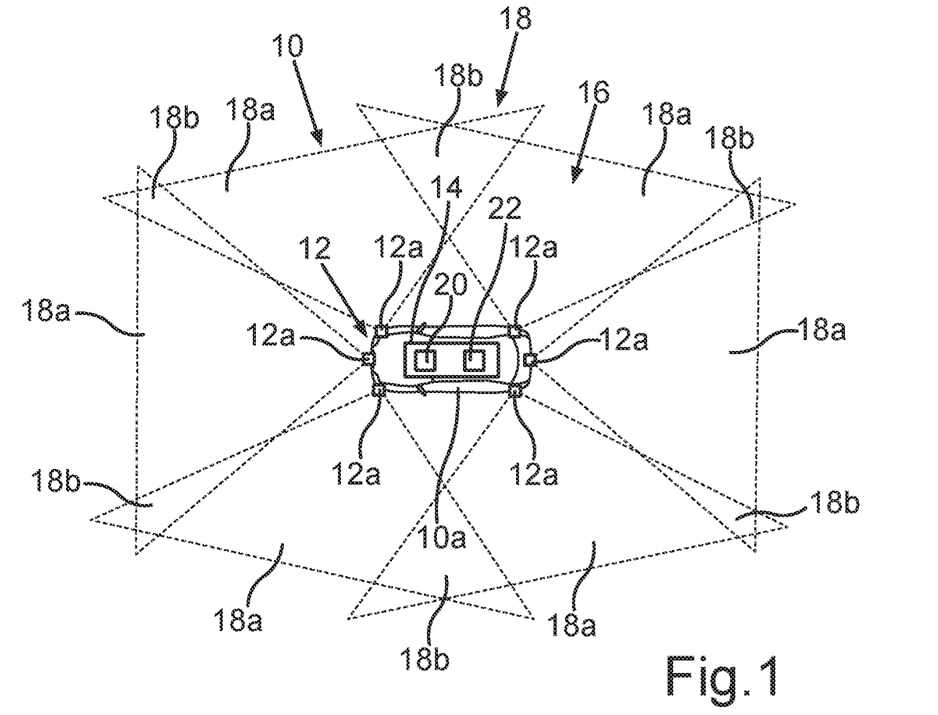
FIG. 1 shows a schematic top view representation of a motor vehicle with a sensor arrangement in accordance with an exemplary embodiment.
Figure 2:
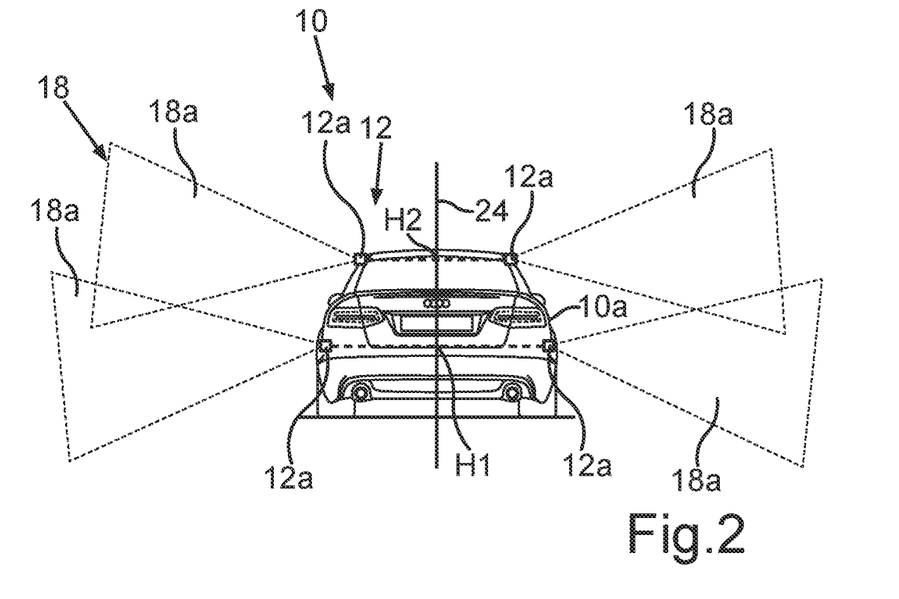
FIG. 2 shows a schematic side view representation of a motor vehicle with the sensor arrangement in accordance with an exemplary embodiment.
Figure 3:
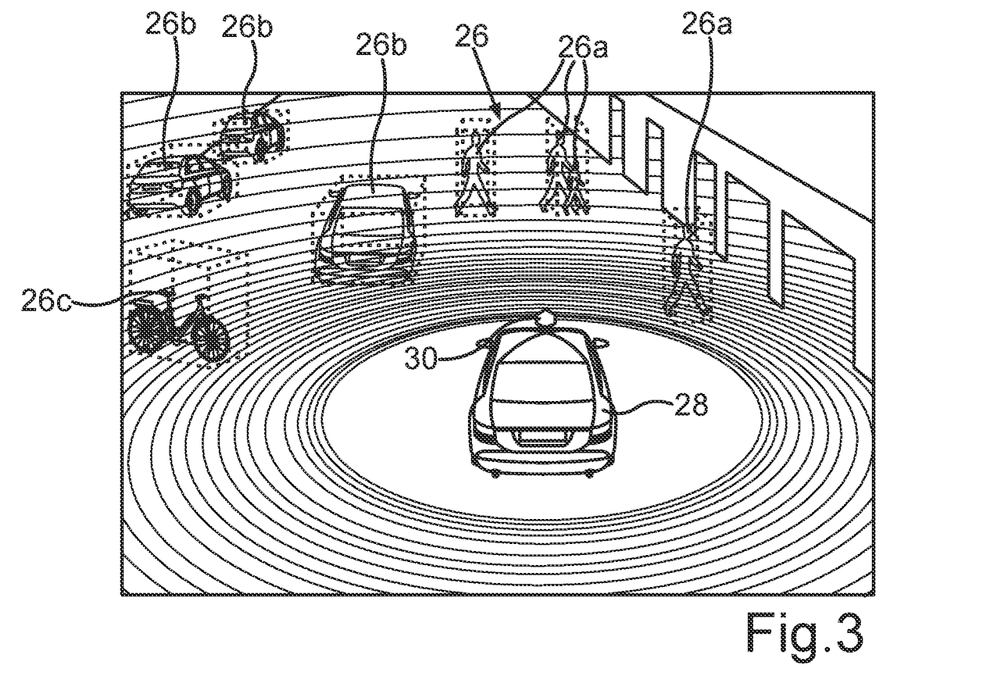
FIG. 3 shows a schematic lateral view representation of a three-dimensional image of the surroundings produced from a 3D point cloud.
Figure 4:
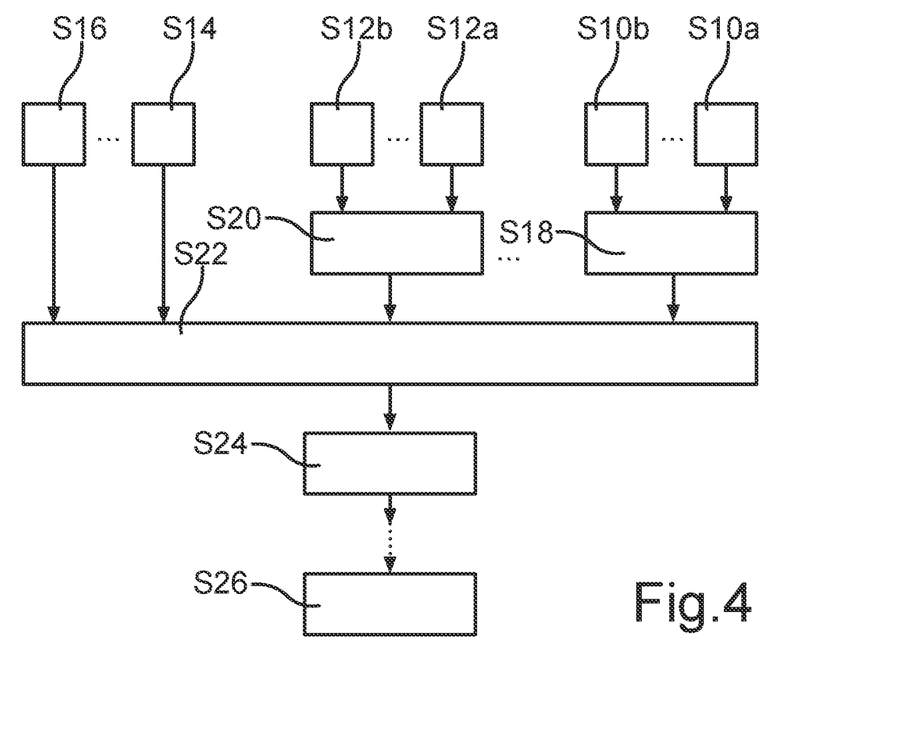
FIG. 4 shows a flow chart for visualizing a procedure for 360° recording of the surroundings of a motor vehicle in accordance with an exemplary embodiment.

Additional advantages, characteristics and details of the presented embodiments derive from the following description as well as the drawings, which show:

FIG. 1 a schematic top view representation of a motor vehicle with a sensor arrangement in accordance with an example embodiment;

FIG. 2 a schematic side view representation of a motor vehicle with the sensor arrangement in accordance with an example embodiment;

FIG. 3 a schematic lateral view representation of a three-dimensional image of the surroundings produced from a 3D point cloud; and FIG. 4 a flow chart for visualizing a procedure for 360° recording of the surroundings of a motor vehicle in accordance with an example embodiment.

FIG. 1 shows a schematic representation of a motor vehicle 10 with a sensor arrangement 12 in accordance with an example embodiment. The motor vehicle 10 has a steering control module 14, which can be designed to control driver assistance functions. In particular, it can be designed to control fully and highly automated driving functions of the motor vehicle 10. Such highly and fully automated driving functions require reliable detection of the surroundings 16 of the motor vehicle 10.

To accomplish this as economically as possible, the sensor arrangement 12 of the motor vehicle 10 comprises several sensors 12a of the same kind. These sensors 12a can, for example, be configured as cameras, as radars, etc. It is of particular advantage if the sensors 12a are simple laser scanners. These sensors 12a have respective detection zones 18a assigned to them, which in sum constitute a full detection zone 18. This full detection zone 18 extends over a complete angle around the motor vehicle 10 and thus covers 360° of the environment and/or the surroundings 16 around the motor vehicle 10, at least starting from a predetermined distance from the motor vehicle 10. It is by means of these multiple sensors 12a and their respective detection zones 18a that the entire field of vision of a 360° 3D laser scanner can be approximated. To accomplish this, six simple laser scanners can, as in this example, be installed on the exterior 10a of the motor vehicle 10, dispersed in a manner such that their six fields of vision 18a cover the entire field of vision of a 360° 3D laser scanner. The sensors 12a can, for example, be positioned at the front, the tail, the corner areas, the sides near the doors, etc. of the vehicle. The number of sensors 12a to be used and their position can depend on the nature of the sensors 12a and the desired quality of the approximation. For example, this number can rise if the individual sensors 12a have a small detection zone or if the recorded sensor data are to describe the surroundings 16 completely and if need be redundantly. It can be that a certain part of the surroundings in the proximity of the vehicle does not have to be covered by detection zones 18 of the sensors 12a, because a 360° 3D laser scanner, if it is located on the roof of a motor vehicle, likewise exhibits shadings in these regions and cannot record these regions in the proximity of the motor vehicle.

The sensors 12a now record the surroundings 16 in their respective detection zones 18a in the form of respective sensor data, which are made available for purposes of preprocessing to a preprocessing mechanism 20 of the motor vehicle 10, which can, in particular, be part of the control module 14. The recording by the respective sensors 12a takes place in defined and synchronized time steps. Such synchronization can, for example, be provided by a synchronization signal, in particular one which triggers the recording by the respective sensors 12a or on the basis of which the sensors 12a synchronize their respective collection time steps. The data from all of the sensors 12a belonging to the same time step are then fused by the preprocessing mechanism 20 and are depicted in a common database, for example as a 3D point cloud. This uni-temporal fusion makes it possible to provide a 3D point cloud whose characteristics do not differ from those of the 3D point cloud made available by a 360° 3D laser scanner. The recording of an expensive 3D laser scanner can thus be advantageously emulated by several advantageous single sensors 18a. This advantageously allows for the use of algorithms for the subsequent processing of the fused sensor data, which can, for example, be accomplished by a processing mechanism 22 of the motor vehicle 10. The use of several individual sensors 12a additionally offers other big advantages. As shown in FIG. 1, there are also overlap regions 18b in which at least two detection zones 18a overlap. Redundant sensor data, i.e. from at least two sensors 12a in the same surroundings, are accordingly made available within these regions 18b, which sensor data can then be used advantageously to provide a higher resolution in these regions, to compensate for or reduce measurement uncertainties, or generally to achieve a higher quality by means of data matching.

Depending on the application and the surroundings to be covered in the vertical direction, the sensors 12a can also be positioned on different planes with regard to the vertical axis 24 of the motor vehicle 10, as shown schematically in FIG. 2. FIG. 2 shows a side view of the same motor vehicle 10 with the sensor arrangement 12. In this case the sensors 12a are located on 2 planes, in particular a first plane, which is located at a first height H1 with respect to the vertical axis 24, and on a second plane, which is located at a second height H2 with respect to the vertical axis 24. Such a configuration is particularly advantageous when laser scanners are used as sensors 12a. Laser scanners are preferably disposed on the motor vehicle 10 and/or its exterior 10a in such a manner that the detection zone is larger in the horizontal direction than in the vertical direction. The detection zone 18a can, for example, cover an angular range between 140° and 160° in the horizontal direction, and an angular range between 3° and 10°, in particular preferably between 3° and 5°, in the vertical direction. It is by means of such a configuration that high spatial coverage of the surroundings 16 can advantageously be provided, which is particularly made possible by the allowing the sensors 12a to be displaced vertically with respect to one another.

FIG. 3 shows a schematic representation of a three-dimensional image of the environment and/or the surroundings 16 based on a 3D point cloud, which was produced, in this case, by a 3D laser scanner 30, in particular a Velodyne laser scanner, mounted on the roof of a motor vehicle 28. This three-dimensional image 26 based on a 3D point cloud can also be made available in the same way by the motor vehicle 10 with the sensor arrangement 12 in accordance with an embodiment, in particular by producing this 3D point cloud by means of uni-temporal data fusion of the sensor data recorded by the individual sensors 12a. Such an image 26 can advantageously be put to further use for the detection of persons 26a, vehicles 26b and cyclists 26c in further processing steps, which can, for example, be performed by the processing mechanism 22.

FIG. 4 shows a flow chart for purposes of illustrating a procedure for 360° recording of the surroundings of a motor vehicle 10 in accordance with an example embodiment. In this case, sensors 12a of a first kind, e.g. laser scanners, acquire sensor data in steps S10a and S10b at least approximately simultaneously, i.e. preferably with a maximum mutual time difference in the millisecond range, maximally the two-digit millisecond range, and provide these data to the preprocessing mechanism 20. Other sensors 12a of a second type, for example radars or cameras, can optionally acquire sensor data in a mutually simultaneous way in steps S12a and S12b and provide them to the preprocessing mechanism 20. The preprocessing mechanism 20 performs a uni-temporal data fusion of the sensor data acquired by the sensors 12a of the first type in step S18. Only those sensor data are thus exclusively combined, which are, on the one hand, assigned the same acquisition time step and, on the other hand, from sensors 12a of the same kind. A uni-temporal data fusion of the sensor data acquired by the sensors 12a of the second kind can also be performed in the same way by the preprocessing mechanism 20 in step S20. It is generally possible to not only use several laser scanners for the uni-temporal data fusion but also radar detectors, various kinds of cameras, such as mono-cameras, stereo-cameras, fish eye cameras, time-of-flight cameras, etc., or other sensors, and to combine their data appropriately. In the preprocessing step, which is performed in the respective steps S18 and S20, the sensor measurements from all sensors of the same kind are, on the one hand, assembled into a uniform point cloud, which emulates the measurement by a 3D laser scanner 30. A calculated improvement of individual data points takes place on the other hand. It is also possible to perform a transformation of the data as necessary for subsequent steps during the preprocessing operation, such as a conversion into an object list, fences representations, and/or occupancy grids.

It is, for example, possible to reduce the measurement uncertainties of individual reflections when radar detectors are used to approximate the 3D laser scanner 30. For example, in the case of typical radar detectors, the angular error increases with increasing distance from the principal sensor axis. Sensor data fusion methods offer the possibility of reducing this error in regions with overlapping sensor fields of vision and to thus produce a more exact image of the surroundings.

The combination of the sensor measurements is thus not exclusively limited to the position of a measurement, but additionally comprises sensor effects such as measurement uncertainties and probabilities of existence. It is also possible to combine additional sensor-specific characteristics, for example the intensities in measurements by laser scanners, the colors in measurement by an RGB camera or the speeds in measurements by a radar.

The motor vehicle 10 can furthermore also have different sensors of any type, whose sensor data can likewise be acquired in steps S14 and S16. The sensor data acquired in these steps S14 and S16, as well as the uni-temporally data fused in steps S20 and S18 then can be made available to a processing mechanism 22 for further processing. This processing step can, for example, combine the data supplied to it in step S22 in accordance with another sensor data fusion. Additional optional processing steps can furthermore be performed, such as, for example, a situational analysis in S24, now based on the collectively fused sensor data, all the way up to the implementation of the last function by a driver assistance system in step S26. It is for example possible to detect and classify static or moving obstacles, objects, as well as the described persons, motor vehicles or cyclists, as well as road markings or the like based on a situational analysis. It is accordingly possible to allow the motor vehicle 10 to perform suitable driving maneuvers in S26, in particular in a fully or highly automated manner, based on this detection of the surroundings and classification of objects.

The uni-temporal data fusion according to the presented embodiments can thus be performed particularly advantageously in a processing chain for highly and fully automatic and/or controlled driving.

Such a motor vehicle and a process for 360° the detection of the surroundings, which facilitate the use of algorithms by way of the same database, such as for example 3D point clouds, as well as faster development through the use of algorithms, efficient development via the direct adoption of research results in standard products, cost reduction through the use of a plurality of sensors and, where applicable, established sensor technologies, hidden installation of the sensors, and a very high reliability for driver assistance systems and autonomous driving, in particular by way of the possibility of simultaneously capturing the entire surroundings of vehicle by way of different sensor measurement principles, such as for example radar and lasers, are collectively made available.

The invention claimed is:

1. A motor vehicle comprising:
a sensor arrangement for 360° capture of surroundings of the motor vehicle, the sensor arrangement comprising:
a plurality of sensors, each of which are of a same kind, with the plurality of sensors each respectively having a predetermined detection zone, wherein the plurality of sensors are disposed in a distributed manner around an exterior of the motor vehicle such that the predetermined detection zones of the plurality of sensors collectively provide an overall detection zone, which covers a region of the surroundings at a predetermined distance from the motor vehicle in a complete angle around the motor vehicle, with each of the plurality of sensors being configured to record the surroundings in their respective detection zone as respective sensor data in respective successive synchronized time steps, and
a preprocessing mechanism configured to:
acquire the sensor data from each of the plurality of sensors;
fuse the sensor data from the plurality of sensors for a respective identical time step to produce a three-dimensional image of the surroundings that is produced in a common database, with at least two of the detection zones of the sensors overlapping, whereby an overlap region is made available, wherein respective measurement uncertainties of each of the sensors of the overlap region are also included in the sensor data;
equalize the sensor data acquired by the respective sensors in the overlap region, wherein based on the equalization; and
perform a sensor data correction by calculating a weighted average of the sensor data relating to an identical local area of the surroundings acquired by two respective sensors, wherein a respective weight of sensor data used in said calculating depends on the respective sensor measurement uncertainty, for each of the two respective sensors;
the preprocessing mechanism is further configured to carry out at least one of:
perform a measurement uncertainty correction to sensor data redundantly recorded in the overlap region, which assigns a reduced measurement uncertainty that is smaller than the measurement uncertainties originally included in the sensor data; or perform a correction concerning a probability of existence of objects in the surroundings based on the measurement uncertainties.

2. The motor vehicle of claim 1, wherein each of the plurality of sensors are laser scanners.

3. The motor vehicle of claim 1, wherein each of the plurality of sensors are respectively radars or cameras or stereo-cameras or time-of-flight cameras or ultrasonic sensors.

4. The motor vehicle of claim 1, wherein the preprocessing mechanism provides the fused sensor data as a 3D point cloud database.

5. The motor vehicle of claim 1, wherein the preprocessing mechanism converts the fused sensor data into an object list representation or a fences representation or an occupancy grid representation.

6. The motor vehicle of claim 1, wherein each the plurality of sensors provide information that is different from position information, in a form of intensity information and/or color information and/or speed information about a recorded surrounding space in relation to the motor vehicle, where the motor vehicle further comprises a processing mechanism, with the preprocessing mechanism being configured to convey the fused data in the common database to the processing mechanism, wherein the processing mechanism combines the fused sensor data with the information made available by each of the plurality of sensors that is different from the position information.

7. The motor vehicle of claim 1, wherein each of the plurality of sensors are disposed at a respective height, with each of the respective heights being located in a predetermined height range with respect to a vertical axis of the motor vehicle.

8. The motor vehicle of claim 1, wherein each of a group of first sensors of the plurality of sensors are located at a respective first height and each of a group of second sensors of the plurality of sensors are located at a respective second height, with the respective first height being in a predetermined first height range with respect to a vertical axis of the motor vehicle, and with the respective second height being in a second height range with respect to the vertical axis of the motor vehicle, which is higher than the first height range.

9. The motor vehicle of claim 1, wherein the respective detection zones for each of the plurality of sensors comprise an angular range between 3° and 5°, in a vertical direction.

10. The motor vehicle of claim 1, wherein the respective detection zones for each of the plurality of sensors comprise an angular range between 140° and 160°, in a horizontal direction.

11. A method for 360° capture of surroundings of a motor vehicle, with the motor vehicle having a plurality of sensors, each of which are of a same kind, the method comprising:
generating, from each of the plurality of sensors, wherein each sensor has a respective detection zone, sensor data of the respective detection zone in synchronized time steps, the respective detection zones of each of the plurality of sensors collectively providing an overall detection zone that covers a range of the surroundings in a complete angle around the motor vehicle at a predetermined distance from the motor vehicle;
fusing the sensor data from the plurality of sensors for a respective identical time step utilizing a preprocessing mechanism;
producing a three-dimensional image of the surroundings represented in a common database from the fused sensor data, wherein at least two of the detection zones of the sensors are overlapping, thereby providing an overlapping region;
performing an equalization, through the preprocessing mechanism, of the sensor data acquired by the respective sensors in the overlapping region, wherein respective measurement uncertainties for each sensor of the respective sensors are included in the sensor data;
performing a sensor data correction including calculating a weighted average of the sensor data relating to an identical local area of the surroundings acquired by two respective sensors, wherein a respective weight of sensor data used in said calculating depends on the respective sensor measurement uncertainty, for each of the two respective sensors; and
one or more of the following steps based on the equalization:
performing a measurement uncertainty correction including assigning a reduced measurement uncertainty to the sensor data redundantly recorded in the overlap region that is smaller than the measurement uncertainties originally included in the sensor data; or
performing a correction concerning a probability of existence of objects in the surroundings based on the measurement uncertainties.

12. The method of claim 11, wherein each of the plurality of sensors are laser scanners.

13. The method of claim 11, wherein each of the plurality of sensors are respectively radars or cameras or stereo-cameras or time-of-flight cameras or ultrasonic sensors.

14. The method of claim 11, wherein the common database of the three-dimensional image produced by the preprocessing mechanism fusing the sensor data is a 3D point cloud database.

15. The method of claim 11, further comprising:
converting, through the preprocessing mechanism, the fused sensor data into an object list representation or a fences representation or an occupancy grid representation.

16. The method of claim 11, further comprising:
generating, through each of the plurality of sensors, information that is different from position information, in a form of intensity information and/or color information and/or speed information about a recorded surrounding space in relation to the motor vehicle;
conveying the fused data in the common database from the preprocessing mechanism to a provided processing mechanism; and
combining, through the processing mechanism, the fused sensor data with the information generated by each of the plurality of sensors that is different from the position information.

17. The method of claim 11, further comprising:
disposing each of the plurality of sensors are at a respective height, with each of the respective heights being located in a predetermined height range with respect to a vertical axis of the motor vehicle.

18. The method of claim 11, further comprising:
disposing each of a group of first sensors of the plurality of sensors at a respective first height, wherein the respective first height is in a predetermined first height range with respect to a vertical axis of the motor vehicle; and
disposing each of a group of second sensors of the plurality of sensors at a respective second height, wherein the respective second height is in a second height range with respect to the vertical axis of the motor vehicle, which is higher than the first height range.

19. The method of claim 11, wherein the respective detection zones for each of the plurality of sensors comprise an angular range between 3° and 5°, in a vertical direction.

20. The method of claim 11, wherein the respective detection zones for each of the plurality of sensors comprise an angular range between 140° and 160°, in a horizontal direction.

* * * * *